(12) United States Patent
Fong et al.

(10) Patent No.: US 7,093,948 B2
(45) Date of Patent: Aug. 22, 2006

(54) DISPLAY DEVICE WITH LIGHT GUIDE

(75) Inventors: Ching Fong, Canton, MI (US); Brian Dehmlow, Canton, MI (US)

(73) Assignee: Yazaki North America, Inc., Canton, MI (US)

( * ) Notice: Subject to any disclaimer, the term of this patent is extended or adjusted under 35 U.S.C. 154(b) by 127 days.

(21) Appl. No.: 11/013,104

(22) Filed: Dec. 15, 2004

(65) Prior Publication Data

US 2006/0126320 A1    Jun. 15, 2006

(51) Int. Cl.
   *G01D 11/28* (2006.01)
(52) U.S. Cl. ............................. 362/30; 362/26; 362/27
(58) Field of Classification Search .................. 362/26, 362/27, 30
   See application file for complete search history.

(56) References Cited

U.S. PATENT DOCUMENTS

| | | | |
|---|---|---|---|
| 3,890,777 A | | 6/1975 | Stanish |
| 4,323,951 A | * | 4/1982 | Pasco ........................... 362/27 |
| 6,152,066 A | * | 11/2000 | Knoll et al. ................. 116/288 |
| 6,276,809 B1 | | 8/2001 | Matsumoto |
| 6,294,990 B1 | * | 9/2001 | Knoll et al. ................. 340/461 |
| 6,302,551 B1 | | 10/2001 | Matumoto |
| 6,572,235 B1 | | 6/2003 | Neugart et al. |
| 6,595,653 B1 | | 7/2003 | Saito et al. |
| 6,883,393 B1 | * | 4/2005 | Ishimaru .................... 73/866.3 |
| 6,886,956 B1 | * | 5/2005 | Parker et al. ................. 362/29 |
| 6,956,995 B1 | * | 10/2005 | Shafaat et al. ................ 385/39 |
| 2002/0135994 A1 | | 9/2002 | Ikarashi et al. |

* cited by examiner

*Primary Examiner*—Ali Alavi
*Assistant Examiner*—Hargobind S. Sawhney
(74) *Attorney, Agent, or Firm*—Harness, Dickey & Pierce, P.L.C.

(57) ABSTRACT

A display device with a face, a pointer, a drive unit, a light guide, a housing member, a first light source and a plurality of second light sources. The face has translucent face indicia and a plurality of translucent indicators. The pointer is disposed on a front side of the dial face and is driven by an output shaft of the drive unit. The light guide, which is disposed rearwardly of the dial face and surrounds the output shaft, includes a guide structure into which a plurality of circumferentially spaced apart apertures are formed. Each of the apertures are aligned to an associated one of the indicators. The housing member is disposed rearwardly of the light guide and includes a plurality of light tunnels, each of which extending into an associated one of the apertures. The first light source disposed rearwardly of the light guide and disposed about the output shaft. The second light source having a plurality of lamps, each of which being disposed in a corresponding one of the light tunnels and being operable for transmitting light through the corresponding one of the light tunnels and illuminating a corresponding one of the indicators.

21 Claims, 4 Drawing Sheets

DISPLAY DEVICE WITH LIGHT GUIDE

INTRODUCTION

The present invention generally relates to display devices and more particularly to a back lit display device with a light guide that permits the mounting of one or more tell tale indicators within an area of a dial face while providing efficient illumination of dial face indicia located along a perimeter of the dial face.

One type of display device that is known in the art employs a circular dial face with dial face indicia (e.g., a scale). The dial face indicia may be efficiently back lit through a circular light guide and a single central light source. While this configuration uniformly illuminates the dial face, tell tale indicators cannot be incorporated into the dial face without severely affecting the uniformity with which the dial face indicia is illuminated.

Another type of display device that is known in the art employs a circular dial face having round, square and/or rectangular tell tale indicators incorporated into the area of the dial face. To illuminate the dial face indicia, however, a relatively large quantity of lamps (i.e., five or more) must be disposed about the perimeter of the dial face to illuminate the dial face indicia with reasonable uniformity.

Accordingly, there remains a need in the art for an improved display device that includes a uniformly back lit dial face, tell tale indicators integrated into the dial face and a light source with a relatively smaller number of lamps.

SUMMARY

In one form, the present teachings provide a display device that includes a dial face, a drive unit, a light guide, a housing member, a first light source and a plurality of second light sources. The dial face has translucent dial face indicia and a plurality of translucent indicators. The drive unit is disposed behind the dial face and includes a motor. The motor includes an output shaft and is operable for driving a pointer about at least a portion of the dial face. The light guide is disposed rearwardly of the dial face and surrounds the output shaft. The light guide includes a guide structure into which sets of first and second apertures are formed. The first apertures are disposed radially between the second apertures and the output shaft. Each first aperture has opposite sides that are flanked by an associated pair of the second apertures. The housing member is disposed rearwardly of the dial face and includes a plurality of light tunnels. Each light tunnel is disposed in an associated one of the first apertures and aligned to one of the indicators. The first light source is disposed rearwardly of the light guide and disposed about the output shaft. Each of the second light sources is configured to transmit light through an associated one of the light tunnels to illuminate a corresponding one of the indicators.

In another form, the present teachings provide a display device with a face, a pointer, a drive unit, a light guide, a housing member, a first light source and a plurality of second light sources. The face has translucent face indicia and a plurality of translucent indicators. The pointer is disposed on a front side of the dial face and is driven by an output shaft of the drive unit. The light guide, which is disposed rearwardly of the dial face and surrounds the output shaft, includes a guide structure into which a plurality of circumferentially spaced apart apertures are formed. Each of the apertures are aligned to an associated one of the indicators. The housing member is disposed rearwardly of the light guide and includes a plurality of light tunnels, each of which extending into an associated one of the apertures. The first light source disposed rearwardly of the light guide and disposed about the output shaft. The second light source having a plurality of lamps, each of which being disposed in a corresponding one of the light tunnels and being operable for transmitting light through the corresponding one of the light tunnels and illuminating a corresponding one of the indicators.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE VARIOUS EMBODIMENTS

Figure 1:
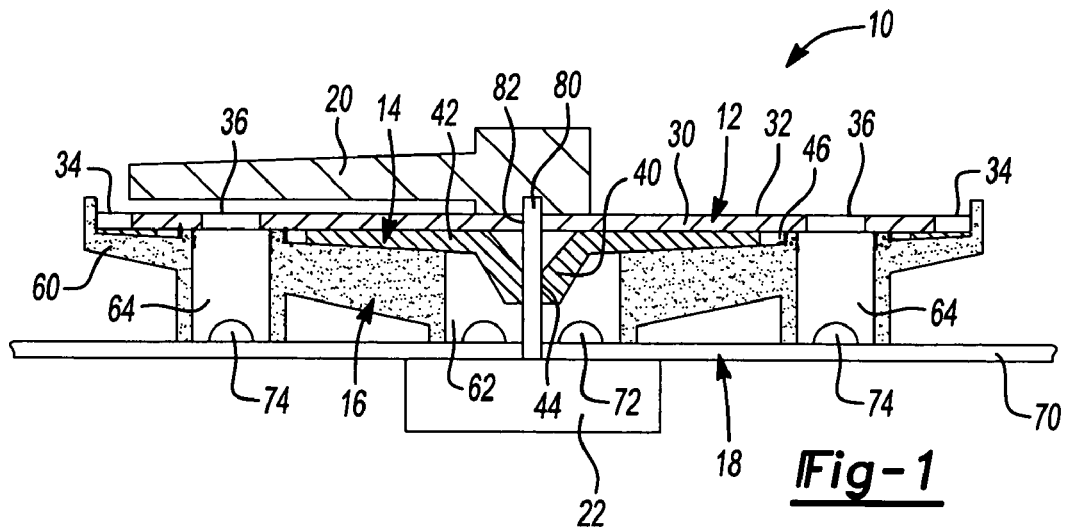
FIG. 1 is a sectional view of a display device constructed in accordance with the teachings of the present invention.

With reference to FIG. 1 of the drawings, a display device constructed in accordance with the teachings of the present invention is generally indicated by reference numeral 10. The display device 10 can include a face 12, a light guide 14, a housing member 16, a circuit board 18, a pointer 20 and a drive unit 22.

Figure 2:
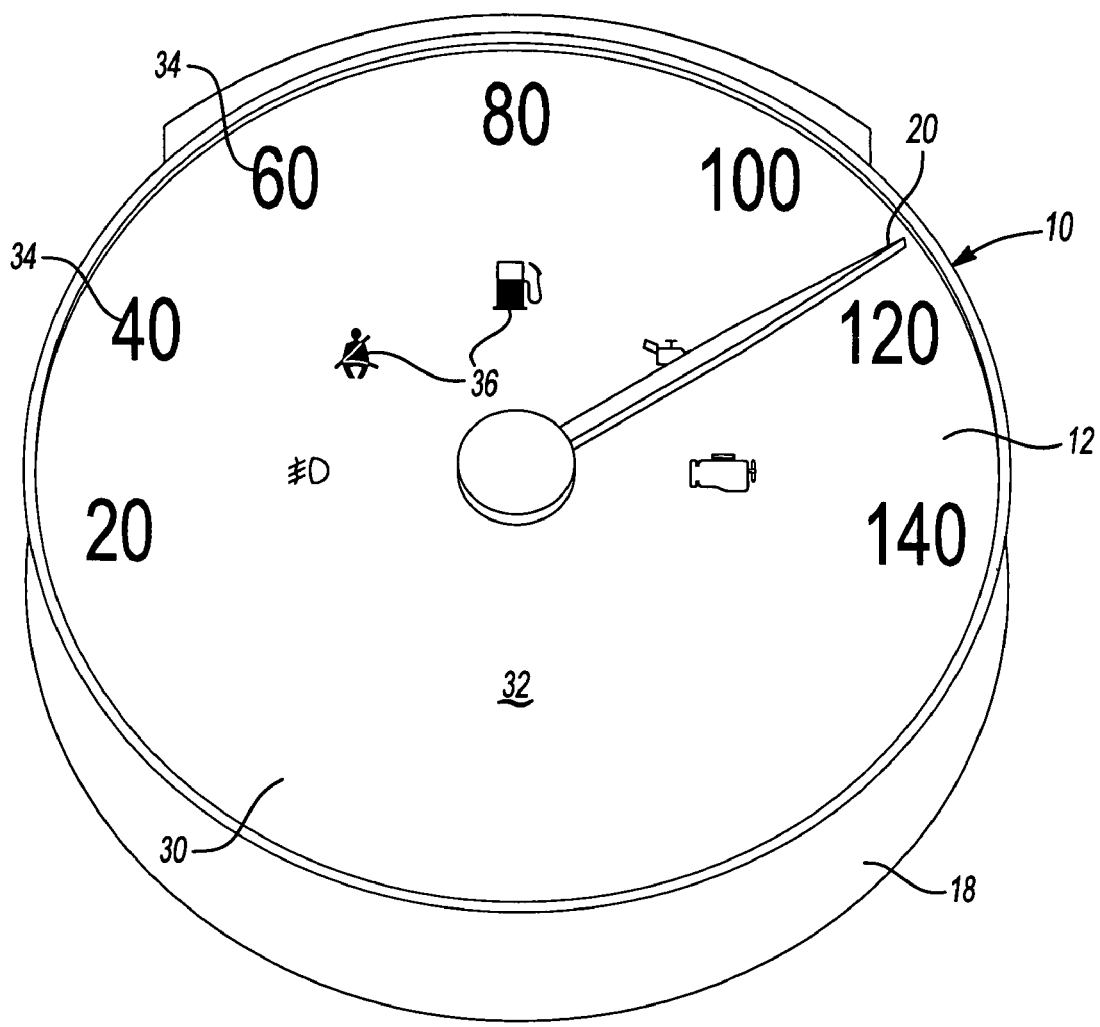
FIG. 2 is a front elevation view of the display device of FIG. 1.

With additional reference to FIG. 2, the face 12 can be any desired shape, such as circular, and can include a structural face member 30 with an opaque field 32, face indicia 34 and a plurality of indicators 36. The opaque field 32 can be formed in any desired manner and can be integrally formed with a portion of the structural face member 30 or can be a discrete component, such as a film, ink or metal that is applied to a portion of the structural face member 30. The face indicia 34 can be formed of a translucent material (e.g., a film or ink) can include a scale with ordered marks and/or number and/or symbols at fixed intervals that can extend about all or a portion of the perimeter of the face 12. The indicators 36 can be disposed within the interior of the opaque field 32 in a desired manner, such as evenly spaced apart about a circle that is concentric with the perimeter of the structural face member 30, and can also be formed of a translucent material (e.g., a film or ink). Each indicator 36 can be formed to have a desired color when illuminated and need not have the same coloration as other indicators 36 or the face indicia 34.

Figure 3:
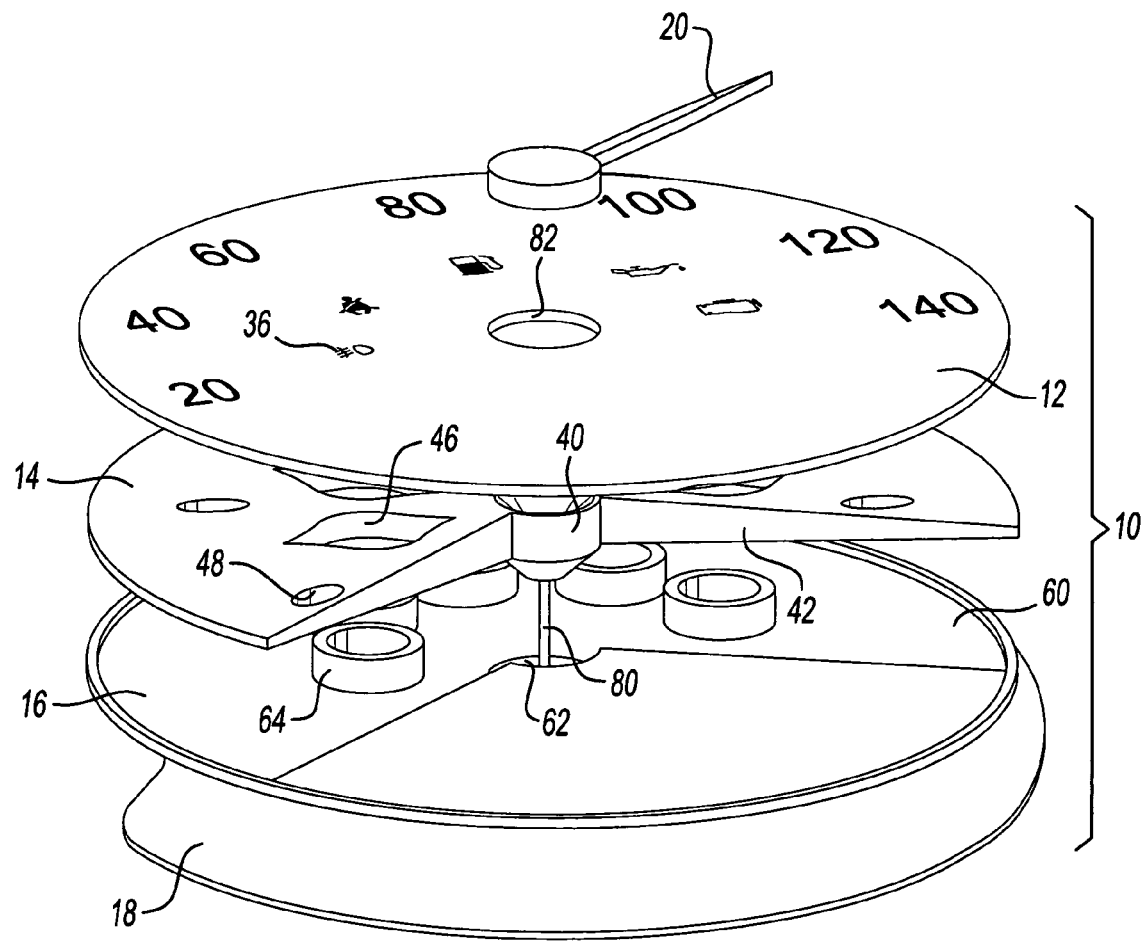
FIG. 3 is an exploded perspective view of the display device of FIG. 1.
Figure 4:
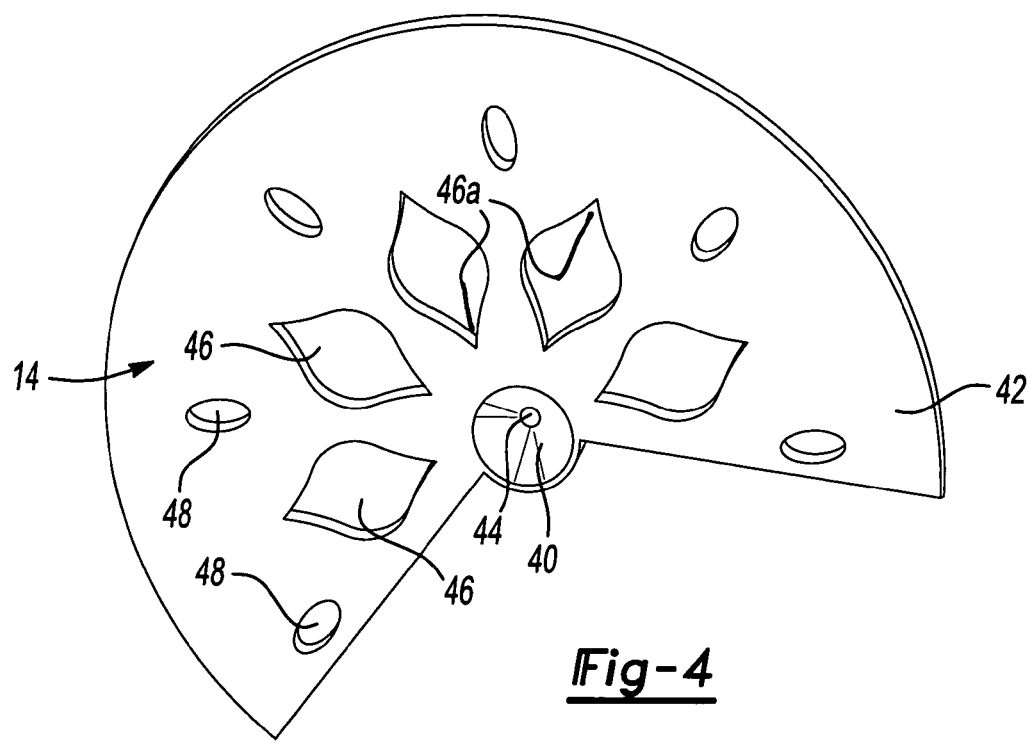
FIG. 4 is a plan view of a portion of the display device of FIG. 1 illustrating the light guide in more detail.

With reference to FIGS. 1, 3 and 4, the light guide 14 can be unitarily formed from a transparent material, such as clear plastic and can include a light receiving portion 40, which is configured to capture light, and a light transmitting portion 42, which receives light from the light receiving portion 40 and directs the light to one or more desired areas. The light receiving portion 40 can have a hollow conical shape that can extend rearwardly from the front face 12 of the light guide 14. An aperture 44 can extend through the center of the light receiving portion 40. The light transmitting portion 42 can be coupled to the perimeter of a portion of the light receiving portion 40 and can extend radially outwardly therefrom. The thickness of the light transmitting portion 42 can be relatively thicker toward the light receiving portion 40 and can taper continuously to its outward edge.

A plurality of first apertures 46 and a plurality of second apertures 48 can be formed through the light transmitting portion 42. The first apertures 46 can be located radially between the light receiving portion 40 and second apertures 48 and can be spaced apart in a manner that matches the spacing and location of the indicators 36 on the face 12. Stated another way, the first apertures 46 can be located in-line with the indicators 36 on the face 12. The second apertures 48 can be positioned such that one of the first apertures 46 is disposed circumferentially between a pair of the second apertures 48 and each of the second apertures 48 can be disposed radially in-line with the aperture 44 in the light receiving portion 40.

Figure 5:
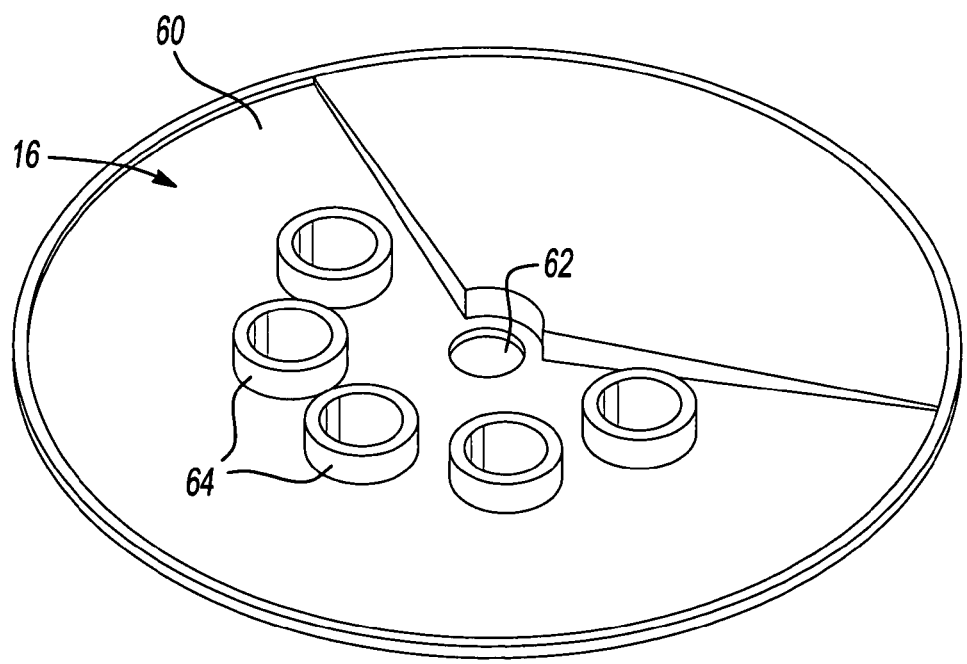
FIG. 5 is a perspective view of a portion of the display device of FIG. 1 illustrating the housing member in more detail.

With reference to FIGS. 1, 3 and 5, the housing member 16 include a shroud portion 60, which can include a central aperture 62, and a plurality of light tunnels 64. The shroud portion 60 can be complementary to the rear side of the light guide 14 and can be configured to cradle the light guide 14 and optionally the face 12. The shroud portion 60 can have a reflective surface, such as a white surface, that is configured to reflect light so that light that escapes rearwardly from the light guide 14 can be reflected toward the light guide 14. Each light tunnel 64 can be a hollow cylinder that is sized to be received into an associated one of the first apertures 46 in the light guide 14 and can be abutted against a rear side of the face 12. The exterior of the light tunnel 64 can be reflective (e.g., white) so that light that escapes from the light guide 14 about the perimeter of an associated one of the first apertures 46 may be reflected toward the light guide 14. The light tunnels 64 can be sized somewhat smaller than the first apertures 46 so as to form a gap (not specifically shown) between the outer perimeter of each light tunnel 64 and an associated one of the first apertures 46. The interior of the light tunnel 64 may also be reflective (e.g., white) so that light that is directed through the light tunnel 64 may be focused in a desired manner.

Figure 6:
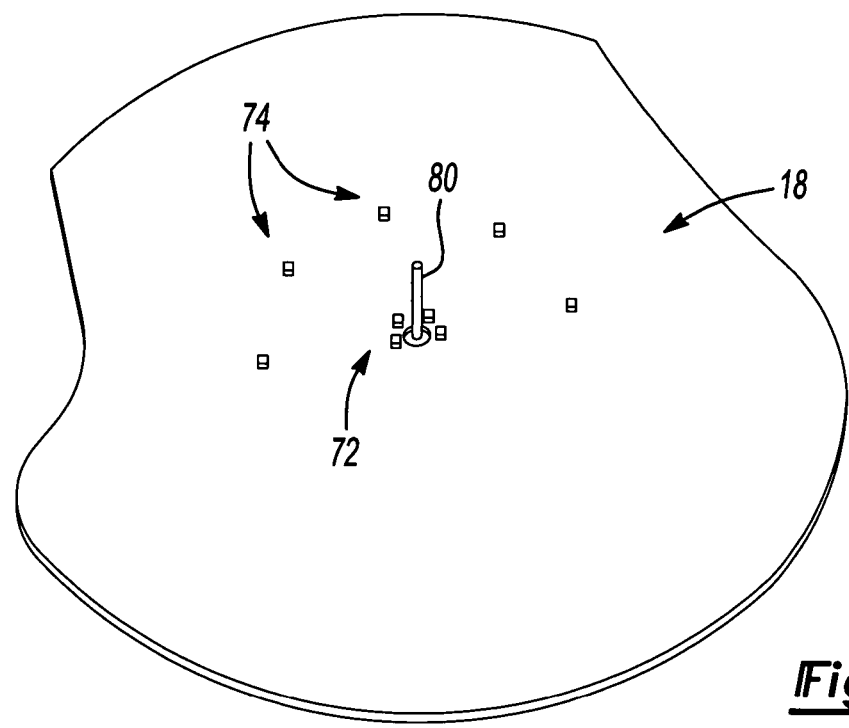
FIG. 6 is a plan view of a portion of the display device of FIG. 1 illustrating the circuit board in more detail.
Figure 7:
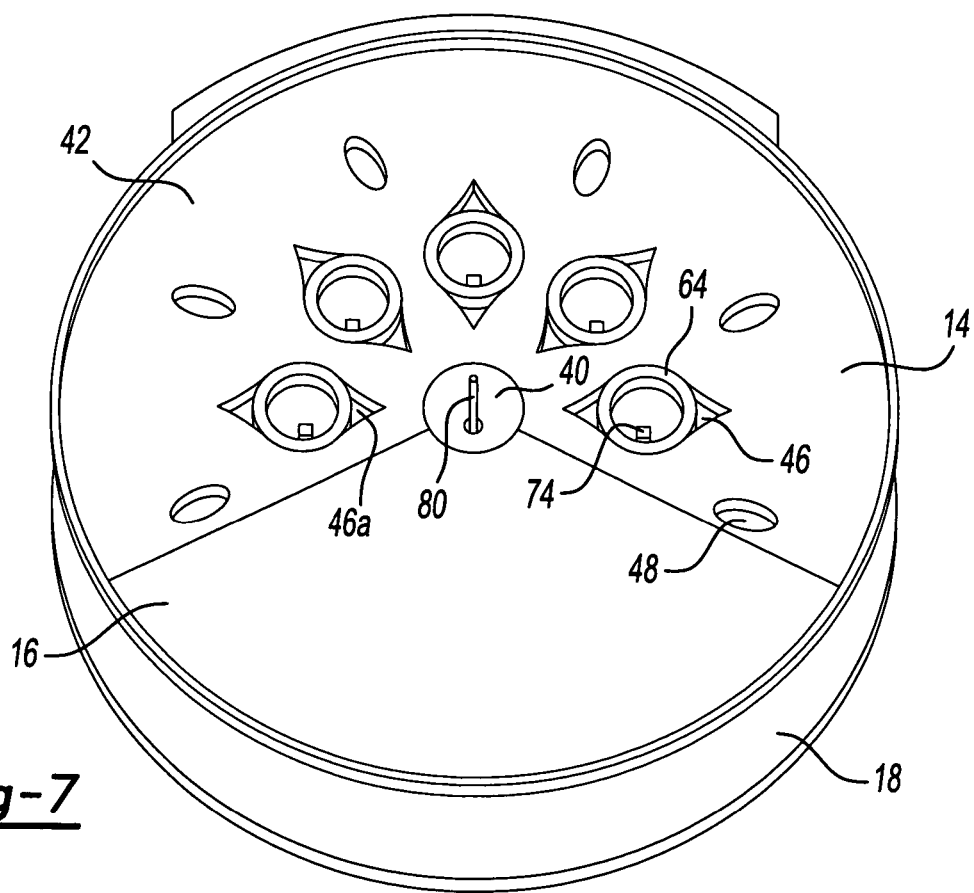
FIG. 7 is a perspective view of the display device of FIG. 1 with the dial face removed.

With reference to FIGS. 1 and 6, the circuit board 18 can include a board member 70 onto which a plurality of first light sources 72 and a plurality of second light sources 74 are mounted. The board member 70 can be coupled to the housing member 16 so as to be positioned in abutment with a side of the housing member 16 that is opposite the light guide 14. The first and second light sources 72 and 74 can be incandescent lamps, light emitting diodes, and/or any other suitable light source. With additional reference to FIG. 7, each of the first light sources 72 can be disposed in the central aperture 62 in the housing member 16 and in-line with the light receiving portion 40 of the light guide 14, while each of the second light sources 74 can be disposed in an associated one of the light tunnels 64 in the housing member 16.

The drive unit 22 and pointer 20 are generally conventional in their construction and operation and as such, need not be discussed in significant detail. Briefly, the drive unit 22 can be coupled to the circuit board 18 and can include a motor, such as a stepper motor, and an output member 80 that is driven by the motor. The output member 80 can extend forwardly from the circuit board 18 in line with the central aperture 62 in the housing member 16, the aperture 44 in the light guide 14 and a hole 82 in the face 12. The pointer 20 can be coupled to the output member 80.

With reference to FIGS. 1, 3, 4 and 7, illumination of the first light sources 72 (as a group) generates light that is transmitted into the light guide 14 for back illumination of face indicia 34, while illumination of a given one of the second light sources 74 (i.e., individually) directly back illuminates an associated one of the indicators 36.

Significantly, the shape of the first apertures 46 permits the face indicia 34 to be uniformly illuminated with a relatively small number of light sources. In this regard, shape of the first apertures 46 is selected to channel light around the light tunnels 64. One shape that is especially well suited is an eye-shape (i.e., a generally elliptical or oval shape with opposite ends that are pointed) as the radially inward pointed end 46*a* tends to gradually divide the light around the light tunnel 64. Due to the gradual angle of expansion from the inward pointed end 46*a*, total internal reflection can occur at the inward boundary surface of the apertures 46, which can lead to little or no light lost in the light channeling process. The second apertures 48 can be sized and shaped so as to reduce or eliminate "hot spots" (i.e., areas of the face indicia 34 that are illuminated with relatively higher intensity). In the particular example provided, the second apertures 48 are generally oval in shape. The size and location of second apertures 48 can be selected to block and redirect light that would otherwise propagate between first apertures 46 without reflection.

In the example provided, four LED's, each having an output of about 2 lumens, are employed to illuminate the face indicia 34 which spans approximately 240° of a 4.3 inch (110 mm) diameter face 12. With this configuration, the face indicia can be back illuminated to a luminance level sufficient for night time driving. With the future improvement of light output from each individual light source in light sources 72, the number of individual light sources can be further reduced without affecting the uniformity of the back illumination for face indicia 34.

While the invention has been described in the specification and illustrated in the drawings with reference to various embodiments, it will be understood by those skilled in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A display device comprising:
   a dial face having translucent dial face indicia;
   a pointer disposed on a front side of the dial face;
   a drive unit disposed behind the dial face and coupled to the pointer, the drive unit including a motor that drives the pointer about at least a portion of the dial face, the drive unit including an output shaft onto which the pointer is mounted;
   a light guide disposed rearwardly of the dial face and surrounding the output shaft, the light guide including a guide structure into which a plurality of first apertures and a plurality of second apertures are formed, the first apertures being positioned radially between the output shaft and the second apertures, the second apertures being disposed radially in-line with the output shaft and circumferentially spaced apart from an associated adjacent one or ones of the first apertures; and
   a first light source disposed rearwardly of the light guide and disposed about the output shaft, the first light source comprising no more than four lamps, each of the lamps being disposed radially between the output shaft and a radially inward end of the second apertures.

2. The display device of claim 1, wherein each of the first apertures is generally eye-shaped.

3. The display device of claim 1, wherein each of the second apertures is oval in shape.

4. The display device of claim 1, wherein the guide structure includes a light receiving portion that is disposed about the output shaft, the light receiving portion being generally conically shaped.

5. The display device of claim 1, wherein the guide structure includes a light receiving portion and a light transmitting portion that is coupled to and disposed about the light receiving portion, the light transmitting portion being constructed such that a radially outward portion is relatively thinner than a radially inward portion.

6. The display device of claim 5, wherein the outer portion tapers continuously between the light receiving portion and a radially outward edge.

7. The display device of claim 1, wherein each of the lamps is selected from a group consisting of incandescent lamps and light emitting diodes.

8. The display device of claim 1, further comprising a housing member and a second light source, the housing member being disposed rearwardly of the light guide and including a plurality of light tunnels, each light tunnel extending into an associated one of the first apertures, the second light source including a plurality of lamps, each lamp being disposed in a corresponding one of the light tunnels and being operable for transmitting light through the corresponding one of the light tunnels and illuminating an associated indicator that is coupled to the dial face.

9. The display device of claim 8, wherein the lamps of the second light source are LED's.

10. The display device of claim 8, wherein the light tunnels are hollow cylinders.

11. A display device comprising:
    a dial face having translucent dial face indicia and a plurality of translucent indicators;
    a pointer disposed on a front side of the dial face;
    a drive unit disposed behind the dial face and coupled to the pointer, the drive unit including a motor that drives the pointer about at least a portion of the dial face, the drive unit including an output shaft onto which the pointer is mounted;
    a light guide disposed rearwardly of the dial face and surrounding the output shaft, the light guide including a guide structure into which a plurality of circumferentially spaced apart eye-shaped apertures are formed, each of the eye-shaped apertures being aligned to an associated one of the indicators;
    a housing member disposed rearwardly of the light guide and including a plurality of light tunnels, each light tunnel extending into an associated one of the first apertures;
    a first light source disposed rearwardly of the light guide and disposed about the output shaft; and
    a second light source having a plurality of lamps, each lamp being disposed in a corresponding one of the light tunnels and being operable for transmitting light through the corresponding one of the light tunnels and illuminating a corresponding one of the indicators.

12. The display device of claim 11, wherein a plurality of second apertures are formed into the guide structure, each of the second apertures being positioned to flank opposite sides of each of the eye-shaped apertures.

13. The display device of claim 12, wherein the second apertures are generally oval in shape.

14. The display device of claim 11, wherein the guide structure includes a light receiving portion that is disposed about the output shaft, the light receiving portion being generally conically shaped.

15. The display device of claim 11, wherein the guide structure includes a light receiving portion and a light transmitting portion that is coupled to and disposed about the light receiving portion, the light transmitting portion being constructed such that a radially outward portion is relatively thinner than a radially inward portion.

16. The display device of claim 11, wherein each of the lamps is selected from a group consisting of incandescent lamps and light emitting diodes.

17. The display device of claim 11, wherein the first light source includes a plurality of lamps, each of the lamps being selected from a group consisting of incandescent lamps and LED's.

18. A display device comprising:
    a dial face having translucent dial face indicia and a plurality of translucent indicators;
    a pointer disposed on a front side of the dial face;
    a drive unit disposed behind the dial face and coupled to the pointer, the drive unit including a motor that drives the pointer about at least a portion of the dial face, the drive unit including an output shaft onto which the pointer is mounted;
    a light guide disposed rearwardly of the dial face and surrounding the output shaft, the light guide including a guide structure into which sets of first and second apertures are formed, the first apertures being disposed radially between the second apertures and the output shaft, each first aperture having opposite sides that are flanked by an associated pair of the second apertures;
    a housing member disposed rearwardly of the dial face, the housing member including a plurality of light tunnels, each light tunnel being disposed in an associated one of the first apertures and aligned to one of the indicators;

a first light source disposed rearwardly of the light guide and disposed about the output shaft; and a plurality of second light sources, each second light source being transmitting light through an associated one of the light tunnels to illuminate a corresponding one of the indicators.

19. The display device of claim 18, wherein the first light source comprises one or more lamps, the lamps being distributed about the dial face at a spacing that does not exceed one lamp per 80° segment of the dial face.

20. The display device of claim 18, wherein the first apertures are generally eye-shaped.

21. The display device of claim 18, wherein the second apertures are generally oval in shape.

* * * * *